Figure 1:
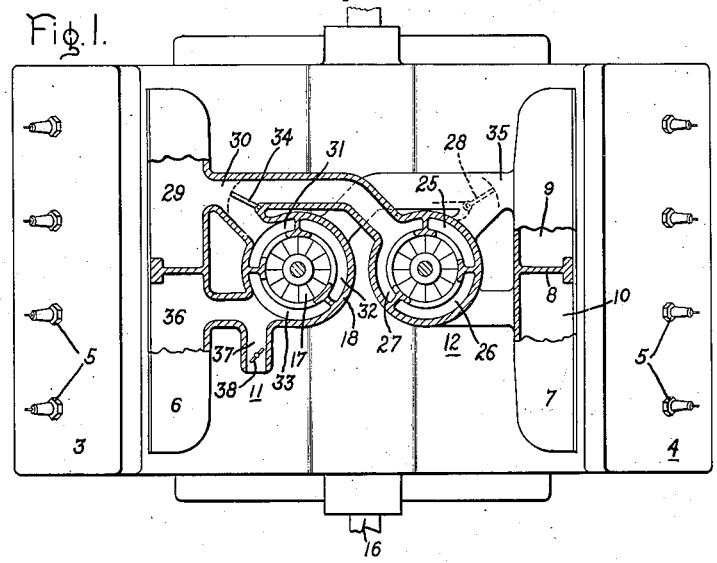

June 10, 1941.  C. W. SMITH  2,245,163

POWER PLANT FOR AIRCRAFT

Filed April 7, 1939

Inventor:
Chester W. Smith
by Harry E. Dunham
His Attorney.

Patented June 10, 1941

2,245,163

UNITED STATES PATENT OFFICE 2,245,163

POWER PLANT FOR AIRCRAFT

Chester W. Smith, Lynn, Mass., assignor to General Electric Company, a corporation of New York Application April 7, 1939, Serial No. 266,651

9 Claims. (Cl. 60—13)

The present invention relates to power plants for propelling aircraft of the type utilizing internal combustion engines.

The object of my invention is the provision of an improved power plant utilizing an internal combustion engine and capable of effectively propelling an aircraft both at low and high altitudes where the atmospheric pressure conditions vary widely. More specifically, my invention has for its object an improved power plant utilizing an internal combustion engine as the main driving element having an exhaust gas turbine arranged to furnish power to assist the engine, a second exhaust gas turbine employed to supercharge the engine, and means for controlling the admission of exhaust gas from the engine in parallel to both of the turbines so that each may properly perform its function.

For a consideration of what I believe to be novel and my invention, attention is directed to the accompanying description and the claims appended thereto.

In carrying out my invention, a compound internal combustion engine is provided, meaning thereby an engine having cylinders and pistons and a gas turbine operating on the exhaust gas from the cylinders, the turbine being geared to the engine shaft. In the case of a simple engine having cylinders and pistons only, it is impracticable to obtain full expansion of the gas in the cylinders, and as a result when the engine is highly supercharged, the exhaust valves open when the gas pressure is very high, and since the gas is discharged directly into the atmosphere, the energy represented thereby is wasted. By expanding the gas through a turbine geared to the shaft, this energy may be converted into useful work.

Furthermore, in order that the engine cylinders may be supplied with substantially the same weight flow of air at all operating altitudes, a centrifugal supercharger or compressor is provided. In my invention, this compressor is driven by another gas turbine operating in parallel with the compounding turbine geared to the engine shaft.

Since the turbines operate in parallel, only a certain fraction of the exhaust gas from the engine cylinders can pass through each. Ordinarily, the most efficient and desirable division of the gases will be such that enough is constrained to flow through the supercharger turbine to develop the power required by the compressor at the altitude of operation, and the remainder is permitted to flow through the compounding turbine. If the amount of gas is more than is needed for both turbines, the excess may be permitted to escape to atmosphere through a waste gate.

Since the speed and required power of the compressor increase as the altitude increases, a greater fraction of the gas will usually be diverted to the supercharging turbine as the altitude increases, and a correspondingly smaller fraction will be available for the compounding turbine. Unlike the supercharging turbine, however, the speed of which increases with altitude, the compounding turbine, being geared to the engine shaft, operates at substantially the same speed at all altitudes; at least, the variation in its speed is much less.

For constant turbine efficiency, it is necessary that a constant ratio be maintained between the velocity of the gas issuing from the turbine nozzles and the speed of the turbine. The velocity of the gas issuing from the nozzles is a function of the pressure ratio across the nozzles. It will be seen that the conditions described in the preceding paragraphs are favorable for maintaining substantially constant efficiency of both turbines over a wide range of altitudes, for the increased supply of gas to the supercharging turbine tends to increase the pressure preceding the nozzles, and hence to increase the pressure ratio and velocity of the gas issuing from the nozzles in rough proportion to the increase of turbine speed, whereas the diminished supply of gas to the compounding turbine tends to decrease the pressure preceding the nozzles, and to maintain the pressure ratio across the nozzles more nearly constant, as required for constant efficiency with a constant-speed turbine.

From the foregoing, it will be seen that the turbine wheel which supplies power to the engine shaft has different operating characteristics from that of the supercharger wheel. This difference is taken care of by the construction and arrangement of the exhaust manifolds and the means associated therewith for controlling the flow of exhaust gases to the wheels, as will appear more fully later on.

Figure 2:
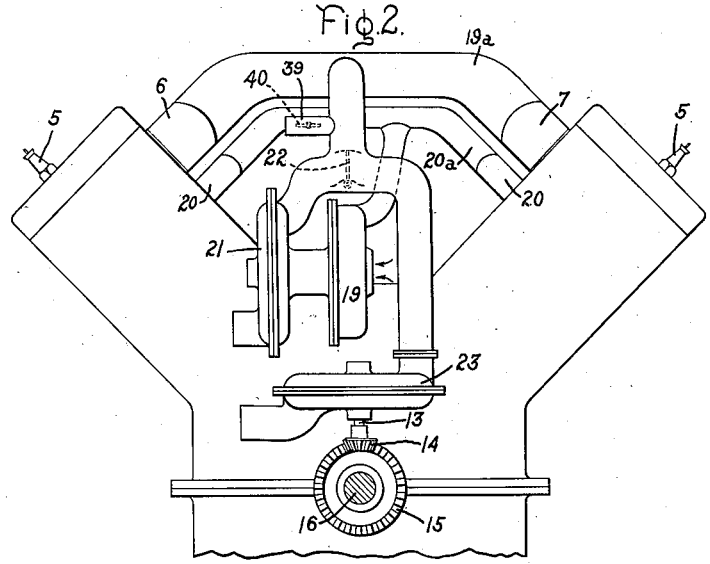

In the accompanying drawing illustrative of my invention, Fig. 1 is a view partly in plan and partly in section of a power plant for driving an aircraft and Fig. 2 is a view in elevation of certain modifications thereof.

Referring to Fig. 1, 3 and 4 indicate sets of cylinders arranged in the form of a V but other arrangements may be employed. As shown, the engine has a total of eight cylinders but a greater or lesser number may be employed. As the particular construction of the engine itself is not material to an understanding of my invention, the details of its construction have been omitted. Each cylinder is provided with a spark plug 5. If the engine be of the type where firing is due to high compression, the plugs will be omitted. Located on oposie sides of the engine, and desirably between the sets of cylinders so as to conserve space and permit the use of short gas conveying conduits to reduce losses by friction, are exhaust manifolds 6 and 7, each receiving the exhaust gases from a set or bank of cylinders. Each manifold may or may not be divided into separate compartments. In the present illustrative example, manifold 7 is divided by a partition 8 into two chambers 9 and 10, each of which in the present illustrative example of my invention receives the exhaust from two cylinders. Where a greater number of cylinders is provided, it may be desirable to divide the manifold into a greater number of chambers. This division of the manifold is so that each piston will not have to travel a substantial portion of its suction stroke before the gas pressure in the manifold drops sufficiently to allow the charge to enter since otherwise the volumetric efficiency would be decreased as well as the output of the engine. By the use of separate chambers in the manifold and proper firing order for the cylinders, or proper combination of the cylinders into groups, each having a separate exhaust chamber, the exhaust of one cylinder will not interfere with that of any other cylinder, and the exhaust pressure will have an opportunity to fall to its naturally low value at the end of the exhaust stroke of each piston.

Located between the manifolds are two gas turbines 11 and 12, the former driving a centrifugal air compressor for supercharging all of the cylinders, and the latter assisting the engine to drive its load. The driving connection between turbine 12 and the engine shaft is similar to that illustrated in Fig. 2 where 13 is the turbine shaft and 14 a pinion mounted thereon, the pinion meshing with a bevel gear 15 secured on the main shaft 16 of the engine. The turbines may be of any suitable or known construction, the bucket wheel being indicated at 17, Fig. 1, and the casing at 18. A centrifugal compressor for supercharging is indicated at 19, Fig. 2, and the air therefrom is delivered to the intake manifolds 20 through conduit 20a. It is driven by a turbine wheel of any suitable or known construction. In Fig. 2, the compressor 19 is driven by a turbine 21 which receives exhaust gases from the manifolds 6 and 7 through conduit 19a subject to the control of a suitable valve 22 indicated by dotted lines, the dotted line at the top of the valve indicating the arc of movement. With the valve in the central position, the supply of exhaust gas is divided substantially equally between the two turbines. Swinging the valve one way or the other from the central position changes this relation and causes a greater supply of gas to flow to one turbine than to the other. The turbine 23 which assists the main engine in driving the load also receives exhaust gases from the manifolds 6 and 7 and conduit 19a subject to the control of valve 22. In Fig. 1, the shafts of both turbines are vertically disposed while in Fig. 2 the shaft of the supercharger unit is horizontal. In this particular, the arrangement of the shafts will be determined largely by the type of engine with which the turbines are associated.

In the illustrative example shown in Fig. 1, the nozzle box of the turbine 12 which assists the main engine in driving the load has three chambers 25, 26 and 27. Chamber 25 receives its supply of exhaust gas from the chamber 9 of the exhaust manifold 7 subject to the control of a suitable valve 28 which may be operated by hand or automatically as desired. Chamber 26 receives its supply of exhaust gas from the chamber 10 of the exhaust manifold 7 and is permanently open thereto. Chamber 27 on the other hand receives its supply of exhaust gas from the chamber 29 of the exhaust manifold 6 which is connected to the left hand group or bank of cylinders through conduit 30. By this cross-over arrangement, the turbine 12 drives its supply of exhaust gas mostly from the right hand group of cylinders and the remainder from the left hand group.

Referring to the left hand turbine 11 or the one driving the supercharger for supercharging the engine by different amounts as the altitude changes, the nozzle box within the casing 18 is similarly divided by partitions into three chambers 31, 32 and 33. Chamber 31 receives its supply of exhaust gas from chamber 29 of manifold 6 through conduit 30, subject to the control of a suitable valve 34 which may be operated by hand or automatically. By more or less closing the valve 34, as by moving it counterclockwise, the supply of exhaust gases to the supercharger turbine will be decreased and therefore the amount of supercharging at low altitude will be decreased with a corresponding increase of exhaust gases supplied to the compounding turbine and more driving power thus obtained. Chamber 32 receives its supply of exhaust gas through conduit 35 that in turn opens into chamber 9 of the right hand exhaust manifold 7. Chamber 33 is permanently open to receive exhaust from chamber 36 of the left hand exhaust manifold 6. From the passage or conduit leading to the chamber 33 is a short conduit 37 containing a butterfly or other valve 38 which may be operated by hand or automatically and through which more or less of the gas from manifold chamber 36 may be permitted to waste or escape to atmosphere. In Fig. 2, a conduit 39 opens outwardly from the conduit 19a and contains a waste gate or valve 40.

It will be noted from the foregoing that by reason of the cross-over conduits, both turbines receive exhaust gas from more than a single manifold and that by reason of such arrangement, simultaneous compounding and high altitude supercharging may be obtained. Also that because the turbine 12 is positively connected to the main engine shaft, its speed is necessarily determined by the engine speed, which speed will usually be substantially the same at all altitudes. On the other hand, the speed of the supercharger turbine 11 will definitely increase with increase in altitude.

What I claim as new and desire to secure by Letters Patent of the United States is:

1. A power plant for the purpose described, comprising an internal combustion engine, a turbine wheel connected to the shaft thereof to assist in driving it, a centrifugal supercharger for supercharging the engine, a second turbine wheel for driving the supercharger, both of the turbine wheels operating in parallel on the exhaust gases received from the engine, and means for diminishing the supply of gases from the engine to the second wheel and increasing that to the first wheel when the demand for supercharging is small as at low altitudes and increasing the supply of gas to the second wheel as the demand for supercharging increases due to higher altitudes.

2. A power plant for the purpose described comprising an internal combustion multi-cylinder engine for driving the main load, manifolds, each receiving exhaust gas from a part of but not all of the cylinders, a pair of separate turbines operating in parallel at different speeds, means connecting one of the turbines to the shaft of the engine to assist in driving the load, a centrifugal supercharger driven by the other of the turbines at variable speeds for supercharging the engine cylinders, and independent conduits connected to and receiving exhaust gases from the manifolds, each manifold and its connected conduits continuously supplying exhaust gases in parallel to both of the turbines.

3. A power plant for the purpose described, comprising an internal combustion multi-cylinder engine, a pair of separate turbines operated in parallel on the exhaust gases of the engine, each of the turbines having independent chambers for feeding gas to its wheel, speed reducing gearing connecting the wheel of one of the turbines to the shaft of the engine to assist it in driving the load, a centrifugal compressor driven by the other turbine for supercharging the engine, separate manifolds receiving exhaust gases from different cylinders of the engine, conduits each receiving exhaust gases from one manifold and supplying it in parallel to chambers of both turbines, and other conduits each receiving gases from a manifold and supplying it to one of the turbines.

4. A power plant for the purpose described, comprising a compound internal combustion engine having a main shaft, reciprocating pistons for driving the shaft, cylinders in which partial expansion of the combustible gases takes place, and a turbine wheel driven by the gases exhausting from the cylinders, the pressure of the exhaust gases admitted to the turbine wheel being substantially higher than that of the surrounding atmosphere, a driving connection between the turbine wheel and the main shaft whereby the speed of the turbine wheel bears a fixed relation to that of the main shaft at all times, a variable speed turbine driven supercharger for supercharging the cylinders of the engine, the turbine receiving a part of the exhaust from the cylinders in parallel with that admitted to the first mentioned turbine wheel, and means whereby the amount of gas admitted respectively to the turbines may be changed when the altitude of the power plant changes.

5. A power plant for the purpose described comprising a multi-cylinder internal combustion engine having the cylinders thereof divided into groups, an exhaust manifold for each group, first and second turbines operating in parallel on the exhaust of the engine, conduits conveying exhaust gases from the manifolds to both turbines, adjustable valve means controlling the passage of exhaust gases from the manifolds and dividing the gases in the desired ratio between the turbines, a driving connection between the first turbine and the shaft of the engine whereby a definite speed relation between them is maintained, an intake manifold for each group of cylinders, and a supercharger driven by the second turbine for supercharging the engine cylinders by supplying compressed air to the intake manifolds, and means for varying the speed and output of the second turbine by changing the amount of gas admitted thereto when the altitude of the power plant changes.

6. A power plant for the purpose described comprising a multi-cylinder internal combustion engine having its cylinders divided into groups, first and second turbines operating in parallel on the exhaust of the engine, a driving connection between the first turbine and the shaft of the engine, a supercharger for supercharging the groups of cylinders driven by the second turbine, conduit means receiving exhaust gases from more than a single group of cylinders and supplying the gases so received in part to each of the turbines, and valve means for dividing the quantity of gases from the groups of cylinders between the turbines.

7. A power plant for the purpose described comprising a multi-cylinder internal combustion main engine, an exhaust gas first turbine connected to the shaft of the main engine to assist in driving its load, a compressor for supplying compressed gas to the cylinders of the main engine, a second exhaust gas turbine for driving the compressor, conduit means receiving exhaust gas from the main engine and supplying it in parallel to the turbines, and valve means in the conduit means for dividing between the turbines the amount of exhaust gas so received from the main engine.

8. A power plant for the purpose described comprising a multi-cylinder internal combustion engine, an exhaust gas first turbine connected to the shaft of the main engine to assist in driving its load, a compressor for supplying compressed gas to the cylinders of the main engine, a second exhaust gas turbine for driving the compressor, conduit means receiving a portion of the exhaust gas from the main engine and freely and continuously supplying it in parallel to both of the turbines, other conduit means likewise receiving a portion of the exhaust gas from the main engine and supplying it in parallel to both of the turbines, and valve means in said other conduit means whereby the exhaust gas entering them may be apportioned between the turbines to satisfy the load conditions thereof.

9. A power plant for the purpose described comprising a multi-cylinder internal combustion main engine, first and second exhaust manifolds each common to some of the cylinders, each having a partition therein for separating the exhaust of one cylinder from that of another, a first turbine connected to the shaft of the main engine to assist in driving its load, a compressor for supplying compressed gas to the cylinders for supercharging the main engine, a second turbine for driving the compressor, first conduits permanently opening one into a chamber of each manifold for receiving exhaust gas therefrom and supplying it in parallel freely and continuously to the turbines, second conduits opening one into another chamber of each manifold for receiving exhaust gas therefrom and supplying it in parallel to the turbines, and valve means in the second conduits whereby the amounts of exhaust gas delivered to the turbines from the main engine may be apportioned between them.

CHESTER W. SMITH.